United States Patent [19]

Higuchi et al.

[11] Patent Number: 5,301,066
[45] Date of Patent: Apr. 5, 1994

[54] LENS BARREL

[75] Inventors: Masayu Higuchi, Hachioji; Yuichi Torikoshi, Shiroyama; Hiroshi Terada, Mitaka; Takeshi Ito, Hachioji, all of Japan

[73] Assignee: Olympus Optical Co., Ltd., Tokyo, Japan

[21] Appl. No.: 903,919

[22] Filed: Jun. 25, 1992

[30] Foreign Application Priority Data

Jun. 28, 1991 [JP] Japan .................. 3-158823

[51] Int. Cl.⁵ .................. G02B 15/14; G02B 7/02
[52] U.S. Cl. .................. 359/698; 359/823; 354/400; 250/201.2
[58] Field of Search .............. 359/823, 696, 697, 698, 359/699, 700, 824; 354/400, 409; 250/201.2, 201.4

[56] References Cited

U.S. PATENT DOCUMENTS 4,750,821 6/1988 Yamamoto et al. ............. 359/697
5,039,202 8/1991 Koyama et al. ............. 359/823
5,078,472 1/1992 Sugawara ............. 359/824

FOREIGN PATENT DOCUMENTS

4-5607 1/1992 Japan .

*Primary Examiner*—Loha Ben
*Attorney, Agent, or Firm*—Louis Weinstein

[57] ABSTRACT

A lens barrel of the present invention directly detects the lens-to-lens spacing between a focusing lens and another lens, whose position relative to the focusing lens exerts the largest influence upon a focused condition, by a measurement detector and, depending on an output indicative of the measured spacing, a controller drives the focusing lens through a driver to a proper in-focus condition. Accordingly, a very valuable advantage results in that a focusing position error of the focusing lens group, which has been encountered in the prior art, can be avoided to enable effective and high-accuracy focusing operation and control through a simplified structure.

31 Claims, 9 Drawing Sheets

LENS BARREL

BACKGROUND OF THE INVENTION

1. Field of the Invention

The present invention relates to a lens barrel, and more particularly to a device for driving and controlling a focusing lens group, which constitutes a lens barrel, to its proper position.

2. Related Art Statement

In recent years, particularly in the field of lens shutter cameras, zoom lenses have enjoyed great popularity and enlargement of the zooming range and reduction in size of zoom lens systems have been progressed. Under such situations, an important problem to be solved to obtain well focused photographs is how to improve the focusing accuracy. For that reason, there have heretofore been presented many proposals relating to driving and control of the focusing position for zoom lenses.

A lens drive unit previously proposed by the applicant in Japanese Patent Laid-Open No. 4-5607 concerns a zoom lens barrel comprising multiple lens groups in which driving and control of the focusing position for a focusing lens group are performed based on the number of shifting pulses from the reference detected position. The structure of the proposed zoom lens barrel will be described below in detail.

Figure 5:
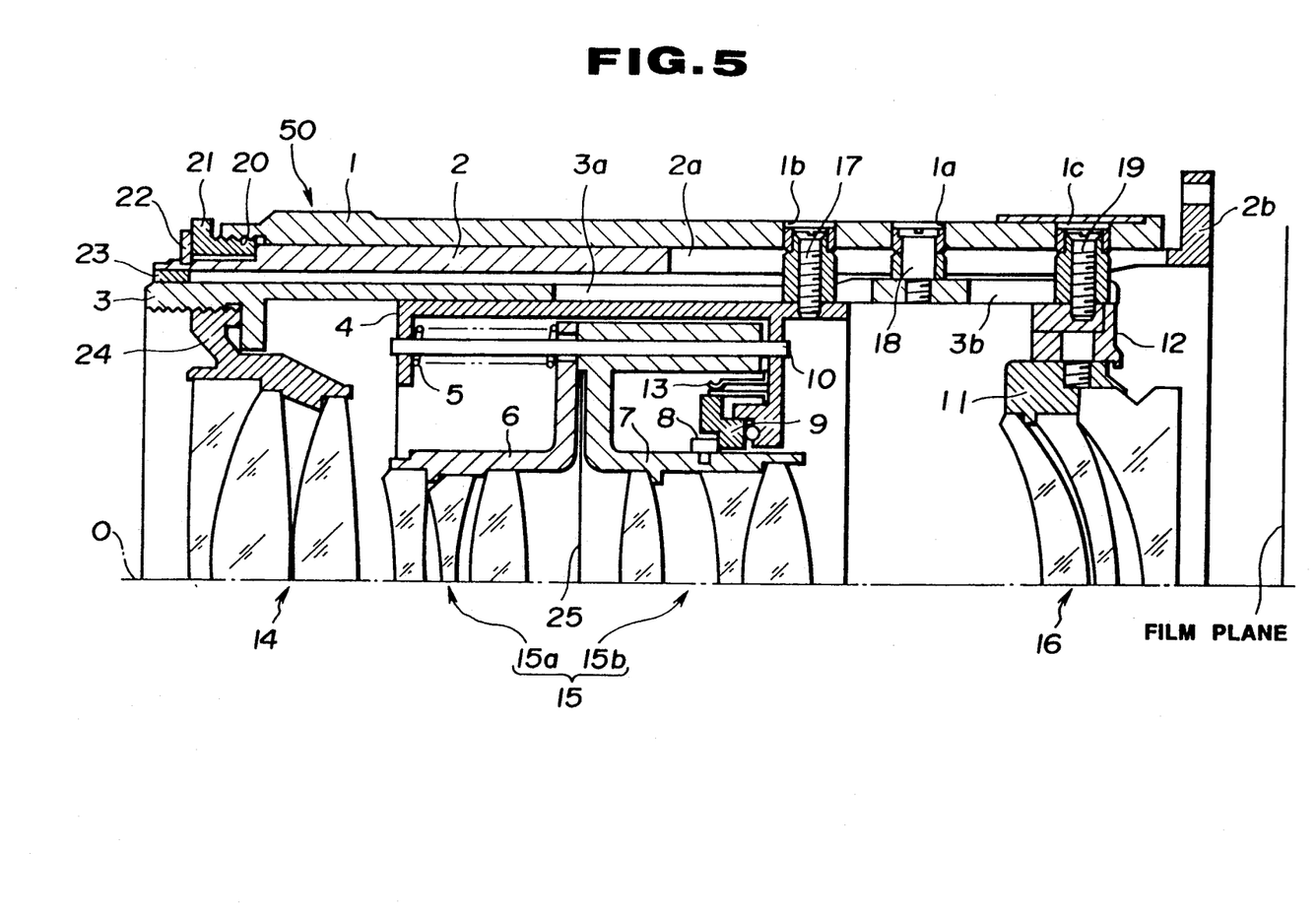
FIG. 5 is a longitudinal sectional view of main parts of a zoom lens barrel, showing the prior art.

FIG. 5 is a longitudinal sectional view of the proposed zoom lens barrel. A zoom lens barrel 50 is of an inner focusing type zoom lens barrel and has a cylindrical fixed frame 2 with a cylindrical cam ring 1 rotatably fitted around the outer circumference of the fixed frame. A threaded portion 20 is formed in the inner circumferential surface of distal end portion of the cam ring 1, and a focus adjusting ring 21 is screwed into the threaded portion 20. By rotating the adjusting ring 21, the cam ring 1 can be finely moved in the axial direction. A retainer ring 22 is attached to the outer circumferential surface of distal end portion of the fixed frame 2 and is held in abutment with the adjusting ring 21.

Within the fixed frame 2, a cylindrical moving frame 3 is inserted movably in the axial direction. Three roller pins 18 (only one being shown) are attached to the outer circumference of the moving frame 3. Each of the roller pins 18 penetrates through a linear groove 2a formed in the fixed frame 2 and is inserted in a first cam groove 1a formed in the cam ring 1. The linear groove 2a is extended in the axial direction of the fixed frame 2 and the cam groove 1a is formed into a spiral shape. Accordingly, by rotating the cam ring 1, the moving frame 3 is linearly moved in the axial direction. Further, to prevent light from externally entering a gap between the fixed frame 2 and the moving frame 3, a light shielding cloth 23 is attached to the inner circumferential surface of distal end portion of the fixed frame 2 and is held in sliding contact with the outer circumferential surface of the moving frame 3.

Within the moving frame 3, there are disposed first, second and third lens groups 14, 15, 16 which jointly constitute a photographing optical system. Among them, the second lens groups 15 serves as a focusing lens group. Those group lenses will now be explained in more detail. The first lens group 14 is supported in the moving frame 3 by a first group frame 24 screwed into the distal end portion of the moving frame 3. A cylindrical second group frame 4 is fitted in the intermediate portion of the moving frame 3 movably in the axial direction. Three roller pins 17 (only one being shown) are projected on the outer circumference of the second group frame 4. Each of the roller pins 17 penetrates through both a linear groove 3a formed in the moving frame 3 and the linear groove 2a formed in the fixed frame 2 and is inserted in a second spiral cam groove 1b formed in the cam ring 1. Accordingly, by rotating the cam ring 1, the second group frame 4 is linearly moved in the moving frame 3 in the axial direction.

A plurality of focusing guide shafts 10 (only one being shown) are fixed to the second group frame 4 and extended in parallel to the axis of the moving frame 3. A front holder frame 6 and a rear holder frame 7 jointly holding the second lens group 15 are supported by the guide shafts 10 movably in the axial direction of the moving frame 3. A focusing spring 5 is coiled around each of the guide shafts 10 to bias both the front holder frame 6 and the rear holder frame 7 reawardly. A pin 8 projected on the rear holder frame 7 is thereby pressed against the cam surface of a ring-like focusing cam 9. By rotating the focusing cam 9 by drive means (not shown), the front holder frame 6 and the rear holder frame 7 are moved forwardly by the cam 9 against the biasing force of the spring 5 so that the second lens group 15 is shifted to make the focusing operation. Additionally, a shutter blade 25 doubling as an iris diaphragm is provided between the front holder frame 6 and the rear holder frame 7.

A third group frame 12 is fitted in the proximal end portion of the moving frame 3 movably in the axial direction of the moving frame. Three roller pins 19 (only one being shown) are projected on the outer circumference of the third group frame 12. Each of the roller pins 19 penetrates through both a linear groove 3b formed in the moving frame 3 and the linear groove 2a formed in the fixed frame 2 and is inserted in a third spiral cam groove 1c formed in the cam ring 1. Accordingly, upon the cam ring 1 being rotated, the third group frame 12 is linearly moved in the moving frame 3 in the axial direction. Further, a holder frame 11 for holding the third lens group 16 is fitted in and fixed to the inner circumference of the third group frame 12. By adjusting relative positions of the third group frame 12 and the holder frame 11 using a well-known mechanism (not shown), the focus shift during the zooming operation can be compensated for.

Figure 6:
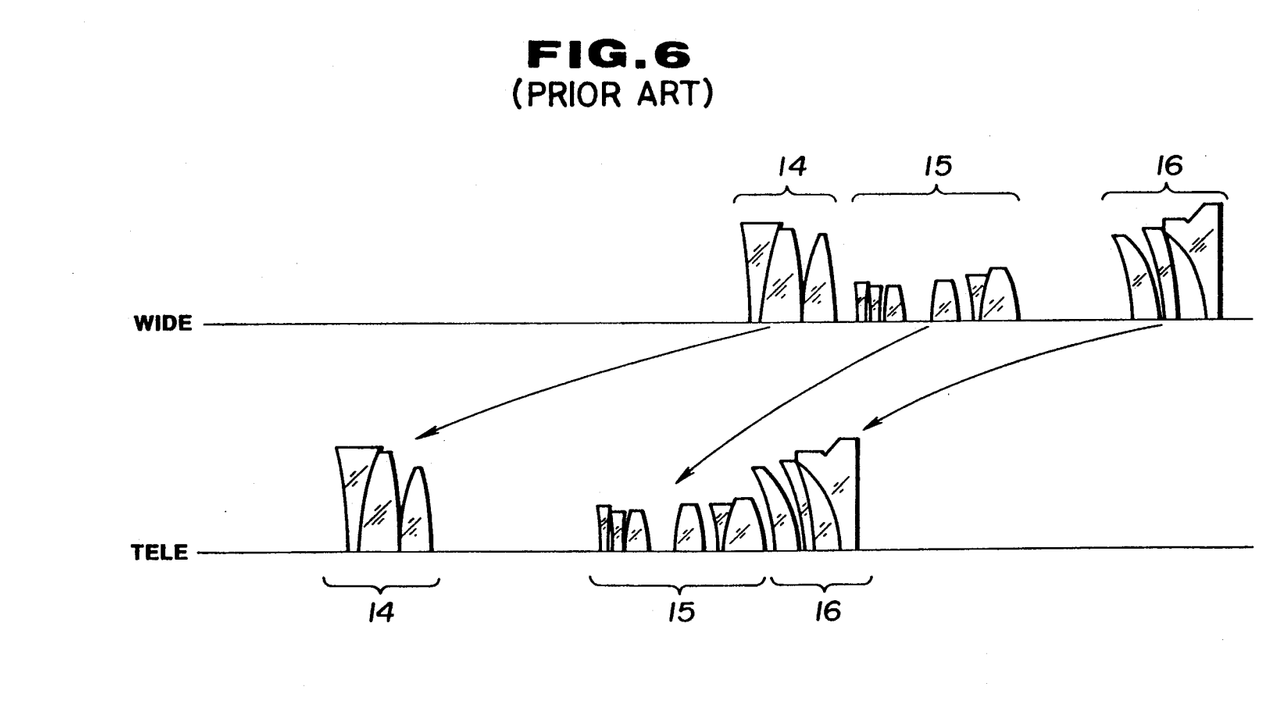
FIG. 6 is a view showing a shifted state of respective lens groups during the focusing operation of the zoom lens barrel shown in FIG. 5.
Figure 7:
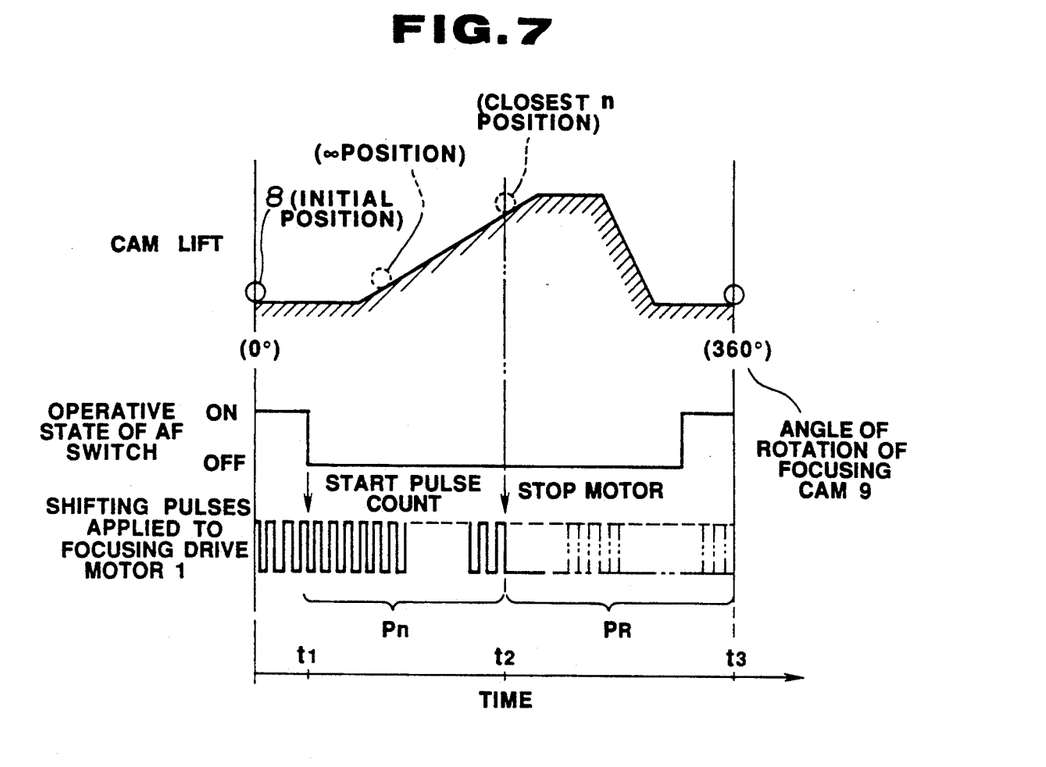
FIG. 7 is a chart showing the relationship between a cam lift and count of shifting pulses.

FIG. 6 shows respective movements of the lens groups during the zooming operation of the lens barrel 50 in the above-mentioned prior art. Through the zooming operation, the first lens group 14, the second lens group 15 and the third lens group 16, serving as photographing lenses, are moved as shown. FIG. 7 shows the status of focusing control in the lens barrel 50 of the foregoing prior art. Because the pin 8 on the rear holder frame 7 of the second lens group 15 is held in abutment with the cam surface of the focusing cam 9, when a focusing drive motor (not shown) starts rotation while generating shifting pulses, the focusing cam 9 also starts rotating. At some rotational position, an AF switch 13 held in abutment with the outer circumference of the focusing cam 9 is changed from an on-state to an off-state. At this timing t1, pulses applied to the focusing motor start to be counted. Before the above operation, the focusing drive amount fit for the photographing distance of each object is set as the number of pulses (e.g., Pn for the closet object). For example, therefore, if the object is at the closest position, the number of pulses Pn is counted and the focusing operation is stopped at the time (timing t2) the second lens group 15 has been shifted to the in-focus position through the pin 8. After the end of the shutter releasing, the focusing motor is driven again by the number of reset pulses Pn for returning the lens to its initial position (timing t3). In this way, a series of sequential operations inclusive of the focusing driving and the shutter releasing are completed.

For a zoom lens, the focal length fT of a total lens system is generally expressed below;

$$fT = f1 \times \beta 2 \times \beta 3 \times \ldots \times \beta n \quad (1)$$

where n is the number of zoom groups, f1 is the focal length of a first lens group, and $\beta i$ is the magnification of an i-th lens group.

Also, assuming that the spacing between the principal points of the i-th zoom group and the (i+1)-th zoom group is Di, the relationship between a deviation $\Delta Di$ of the value Di and a deviation $\Delta fBi$ of the focal plane position due to the deviation $\Delta Di$ is expressed below:

$$\Delta fBi = \{(\beta i+1 \times \beta i+2 \times \ldots \times \beta n)^2 - 1\} \times \Delta Di \quad (2)$$

In Equation (2), depending on the spacing Di between the principal points, $(\beta i+1 \ldots \beta n)^2$ may have an extremely large value in a tele state and may give a large influence on the deviation $\Delta fBi$.

Also, in the case of an inner focusing type lens barrel, when the i-th zoom group is shifted for focusing, a focusing position deviation $\Delta fBi'$ due to such a focusing shift amount $\Delta Fi$ is expressed below:

$$\Delta fBi' = \{(\beta i+1 \times \ldots \times \beta n)^2 - (\beta i \times \beta i+1 \times \ldots \times \beta n)^2\} \times \Delta Fi \quad (3)$$

Figure 8:
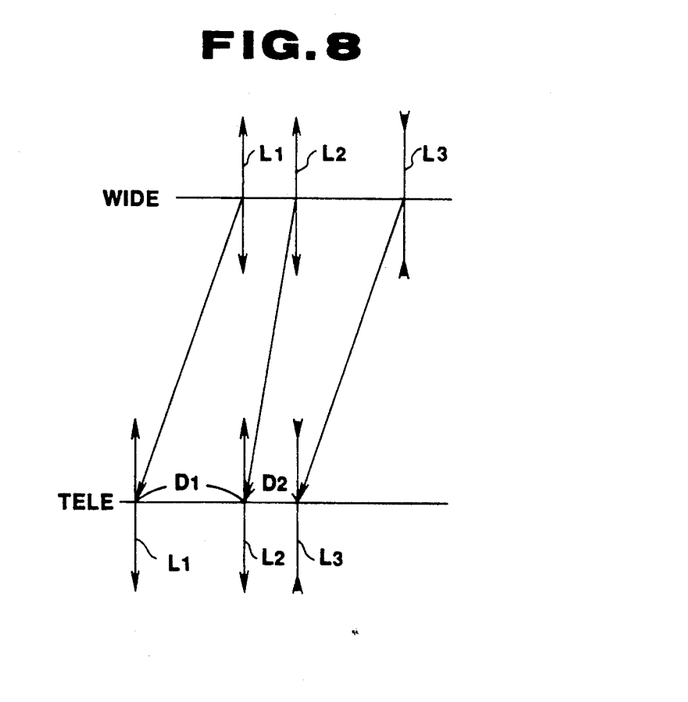
FIG. 8 is a diagram showing a shifted state during the zooming operation in a usual zoom lens.
Figure 9:
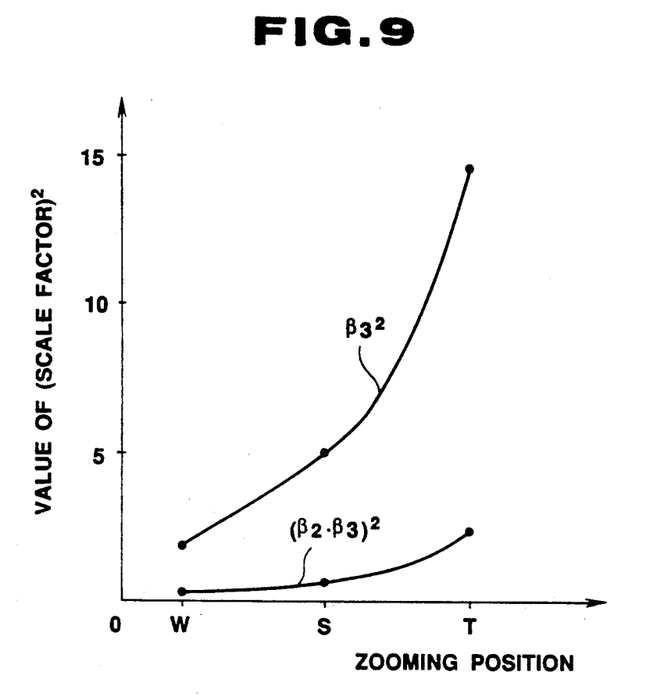
FIG. 9 is a graph showing changes in magnification with respect to zooming positions in the zoom lens of FIG. 8.

FIG. 8 is a diagram showing a zooming condition of a zoom lens barrel comprising three lens groups which has characteristics shown in Table 1 below. It is assumed that the focal lengths f1, f2, f3 of first, second and third lens groups are 68.73, 23.60, and 21.13 (mm), respectively. Also, the following Table 2 shows values of $\beta 3^2$, $(\beta 2 \cdot \beta 3)^2$ and so forth which represent values of (magnification)$^2$ in respective zooming modes of the zoom lens barrel. Furthermore, FIG. 9 shows changes in the values of $\beta 3^2$, $(\beta 2 \cdot \beta 3)^2$ and so forth.

TABLE 1

| | Mode | | |
|---|---|---|---|
| | W (wide) | S (standard) | T (tele) |
| Focal length of system (fT) | 28.94 | 54.57 | 102.5 |
| Spacing between 1st and 2nd primary points (D1) | 16.46 | 26.52 | 31.7 |
| Spacing between 2nd and 3rd primary points (D2) | 10.76 | 3.55 | −1.2 |

TABLE 2

| | Mode | | |
|---|---|---|---|
| Magnification | W (wide) | S (standard) | T (tele) |
| $\beta 2 \cdot \beta 3$ | 0.421 | 0.794 | 1.491 |
| $(\beta 2 \cdot \beta 3)^2$ | 0.177 | 0.630 | 2.22 |
| $\beta 3$ | 1.352 | 2.214 | 3.83 |
| $(\beta 3)^2$ | 1.83 | 4.9 | 14.68 |

As will be seen from the above Tables, the influence of the spacing between the primary points of the second and third lens groups upon the deviation of the focal plane position is given by magnification of 13.68 in the tele mode from the above Table 2 and Equation (2), which is about 10 times as much as the magnification of 1.22 corresponding to the influence of the spacing between the primary points of the first and second len groups. It can therefore be said that when the second lens group is used for focusing, the method of directly controlling the spacing between the second and third lens groups is more accurate in driving to get the target focusing position.

Relating to accuracy of the focusing position, it is thus understood that for the zoom lens barrel 50 of the prior art shown in FIG. 5, the spacing D2 between the primary points of the second lens group 15 and the third lens group 16 is more important in point of the focusing accuracy. However, because the focusing operation is performed by managing the number of drive pulses applied to the drive motor as mentioned above, the occurrence of an error in the spacing D2 between the primary points is unavoidable. Of the basic reasons, the first one is that there are errors in the zooming stop positions of the second lens group 15 and the third lens group 16 both driven with the rotation of the cam ring 1. These errors include manufacturing errors of the cams 1b, 1c and wearing of the pins 17, 19. Another factor is an error in the focusing operation itself. This error includes an offset in the timing due to wearing of the AF cam 9 and chattering of the AF switch 13. An additional factor is a dimensional change of the frame components depending on temperature and moisture. Those factors have in no way been eliminated in the foregoing prior art.

Figure 10:
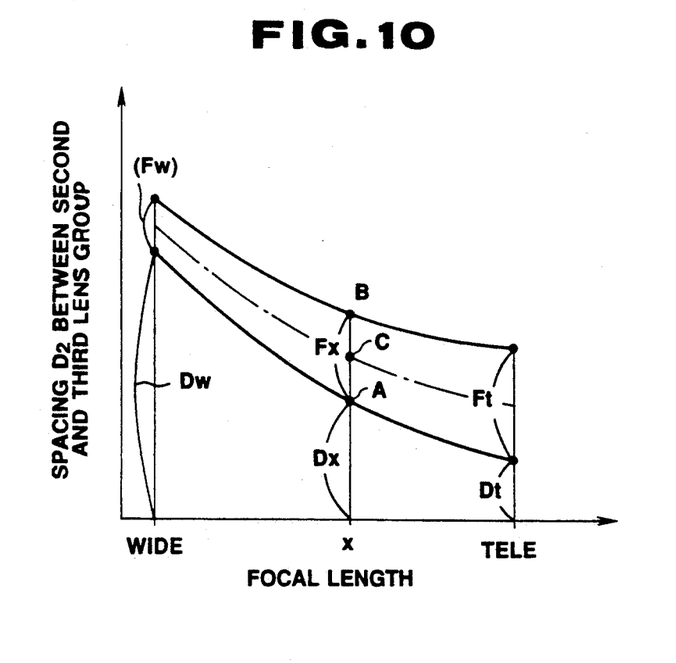
FIG. 10 is a graph showing changes in the spacing between the second and third lens groups with respect to zooming positions in the zoom lens of FIG. 8.

FIG. 10 is a graph showing changes required for the spacing D2 between the second and third lens groups with respect to the focal length ranging from the wide mode to the tele mode. More specifically, the spacing D2 required to focus on an object at the infinity ($\infty$) for some focal length x is given by a value Dx, and the maximum focusing shift amount of the second lens group 15 for the focal length x is given by Fx. In other words, the point A indicates the focusing position of the second lens group 15 adjusted to focus on $\infty$ for the focal length x and the point B indicates the focusing position of the second lens group 15 adjusted to focus on the closest object for the same. Likewise, values Dw, Dt represent the spacing D2 in the wide and tele modes, while values Fw, Ft represent changes in the spacings D2 necessary for focusing in the wide and tele modes, respectively. It is thus required that the spacing D2 between the second and third lens groups is controlled following the characteristics shown in FIG. 10.

OBJECTS AND SUMMARY OF THE INVENTION

The present invention has been made with a view of solving the above-mentioned disadvantage in the prior art, and its object is to provide a lens barrel for use in a lens system needing high-accurate focusing operation and control, which can perform the focusing operation and control with simple structure and extremely high accuracy by managing the distance between focusing lens means and other lens means whose position relative to the former means gives the largest influence upon an in-focus position, for the purpose of remarkably reducing an error in the focusing position of the focusing lens means that has been inevitable in the prior art.

Another object is to provide a lens barrel which can measure the distance between the focusing lens means and the other lens means with further simpler structure and extremely high accuracy by using simple but high-accuracy measuring means.

In the lens barrel of the present invention, the distance between the focusing lens means and the other lens means whose position relative to the former means gives the largest influence upon an in-focus position is measured by measurement means. Depending on an output resulting from measuring the spacing between both the lens means, control means drives the focusing lens means through drive means and stops the focusing lens means at a proper in-focus position.

Other features and advantages of the present invention will be fully apparent from the following description.

DETAILED DESCRIPTION OF THE PREFERRED EMBODIMENT

Hereinafter, the present invention will be described in conjunction with embodiments illustrated.

Figure 1:
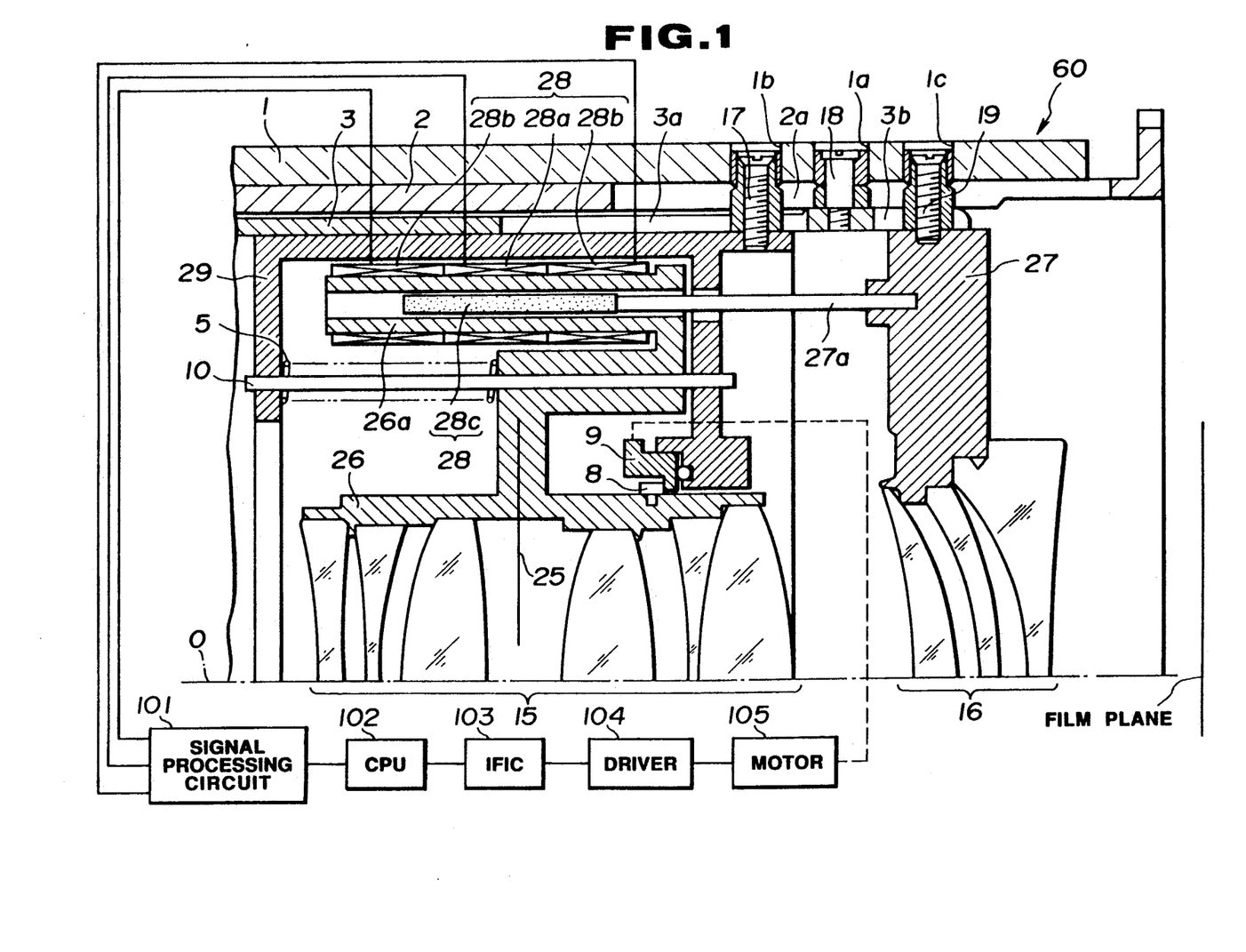
FIG. 1 is a longitudinal sectional view of main parts around second and third lens group frames of a lens barrel, showing a first embodiment of the present invention.

FIG. 1 is a longitudinal sectional view of main parts of a zoom lens barrel, showing a first embodiment of the present invention. A lens barrel 60 of this embodiment is a zoom lens comprising three groups of lenses. A cam ring 1, a fixed frame 2 and part of a moving frame 3 all shown in FIG. 1, as well as a first lens group and so forth (not shown) are of the same structure as those of the lens barrel 50 shown in FIG. 5.

A core shaft 27a is projected in the direction of an optical axis of a third group frame 27 which supports a third lens group 16, and a column-shaped dielectric core 28c is fixed to the distal end of the core shaft 27a. A second lens group holder frame 26 for holding a second lens group 15 has a cylindrical arm 26a provided in convering relation to the circumference of the core 28c. A primary coil 28a and a pair of secondary coils 28b are wound, as cylindrical coil means, around the arm 26a to constitute a differential transformer 28 in cooperation with the dielectric core 28c, which serves as detection or measurement means for measuring the spacing between the second and third lens groups.

The second lens group holder frame 26 for holding the second lens group 15, i.e., a focusing lens group as focusing lens means, is supported by a second group frame 29 through a plurality of focusing guide shafts 10 (only one being shown in FIG. 1), the frame 29 being fitted in slide contact with the inner circumference of the moving frame 3 provided as a separate support.

The third lens group 16 is of lens means whose change in position relative to the second lens group 15, as the focusing lens group, causes the largest amount of change in the focused position during the focusing operation, as has been stated before.

In the focusing operation with the lens barrel 60, the position of the second lens group holder frame 26 relative to the third group frame 27, i.e., the spacing D2 between the second and third lens groups shown in FIG. 8, etc., is detected as a differential voltage produced in the secondary coils 28b and the detected voltage is taken into a CPU (CENTRAL PROCESSING UNIT) 102, as control means, through a signal processing circuit 101. Depending on the detected voltage indicative of the relative positional relationship between both of the lenses, the CPU 102 rotates an AF cam 9 by a driver 104 and a focusing motor 105, both serving as drive means, through an IFIC (INTERFACE IC) 103, thereby moving the second lens group holder frame 26 to a proper in-focus position. Note that the processing flow of the focusing operation and the photographing operation will be described later.

With this embodiment, the distance D2 between the second group lens holder frame 26 and the third group frame 27, which determines the relative position of the second lens group 15 to the third lens group 16 that in turn gives a larger influence upon the focused position, can be directly detected as the output of the differential transformer 28.

Accordingly, it is possible to completely eliminate errors of cams 1b, 1c of the cam ring 1 and an error of the AF cam 9 due to wearing. Also, even if the second group frame 29 supporting the second lens group holder frame 26 is subjected to dimensional changes depending on temperature and moisture, the relative position of the second lens group 25 can be without suffering from any influence of such dimensional changes. As a result, the proper focusing operation can be achieved.

Figure 2:
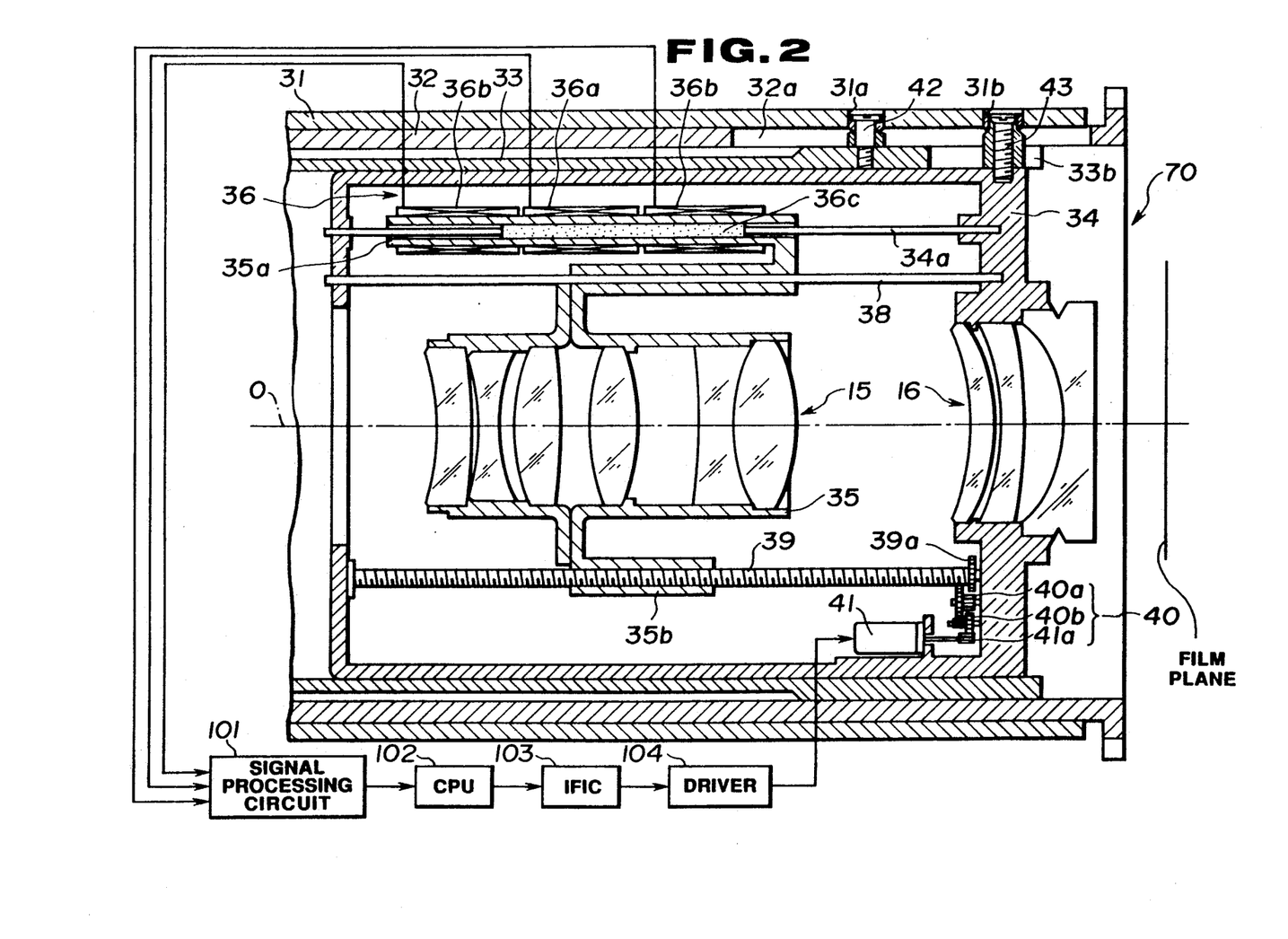
FIG. 2 is a longitudinal sectional view of main parts around second and third lens group frames of a lens barrel, showing a second embodiment of the present invention.

FIG. 2 is a longitudinal sectional view of main parts of a zoom lens barrel, showing a second embodiment of the present invention. A zoom lens barrel 70 of this embodiment is also of an inner focusing type zoom lens barrel comprising three lens groups and has a cylindrical fixed frame 32 with a cylindrical cam ring 31 rotatably fitted around the outer circumference of the fixed frame 32. Within the fixed frame 32, a cylindrical moving frame 33 for holding a first lens group (not shown) is inserted movably in the axial direction.

Three roller pins 42 (only one being shown in FIG. 2) are attached to the outer circumference of the moving frame 33. Each of the roller pins 42 penetrates through a linear groove 32a formed in the fixed frame 32 and is inserted in a first cam groove 31a formed in the cam ring 31. The linear groove 32a is extended in the axial direction of the fixed frame 32 and the cam groove 31a is formed in the cam ring 31 to have a spiral shape. Accordingly, by rotating the cam ring 31, the moving frame 33 is linearly moved in the axial direction.

Within the moving frame 33, there are disposed a first lens group (not shown), a second lens group 15, i.e., a focusing lens group as focusing lens means, and a third lens group 16 as lens means, which jointly constitute a photographing optical system. It is here assumed that a change in the position of the second lens group 15 relative to the third lens group 16 causes a larger amount of change in the focused position during the focusing operation than a change in the position thereof relative to the first group lens.

To explain the support structure of each lens in more detail, a third group frame 34 as a frame for supporting the third lens group 16 is fitted in the proximal end portion of the moving frame 33 movably in the axial direction. Three roller pins 43 (only one being shown in FIG. 2) are projected on the outer circumference of the third group frame 34. Each of the roller pins 43 penetrates through both a linear groove 33b formed in the moving frame 33 and the linear groove 32a formed in the fixed frame 32 and is inserted in a second cam 31b as a spiral cam groove formed in the cam ring 31. Accordingly, by rotating the cam ring 31, the third group frame 34 is linearly moved in the moving frame 33 in the axial direction.

Fixed to the third group frame 34 as a support is a guide shaft 38 for axially moving a second lens group holder frame 35 as a frame for holding the second lens group 15. The second lens group holder frame 35 is disposed within the third group frame 34 while being supported by the guide shaft 38. During the zooming and focusing operations, the rotation of an output gear 41a of a focusing motor 41 fixed to the third group frame 34 is transmitted via a reduction gear 40 to a gear 39a attached to a feed screw 39, which is in turn rotatably supported by the third group frame 34, so that the feed screw 39 is rotated to move the second lens group holder frame 35 along the guide shaft 38.

A core shaft 34a is also fixed to the third group frame 34 in parallel to the guide shaft 38 with a dielectric core 36c being fixed to the intermediate portion of the core shaft 34a. The second lens group holder frame 35 has a cylindrical arm 35a provided in covering relation to the circumference of the core 36c. A primary coil 36a and a pair of secondary coils 36b, each having a cylindrical shape, are wound around the arm 35a to constitute a differential transformer 36 in cooperation with the dielectric core 36c, which serves as measurement means for measuring the frame-to-frame spacing. Thus, the differential transformer 36 detects the spacing between the second and third lens groups. The detected voltage is taken into a CPU 102, as control means, through a signal processing circuit 101. Depending on the detected voltage indicative of the relative positional relationship between both of the lenses, the CPU 102 rotates the feed screw 39 via the reduction gear 40 by a driver 104 and a focusing motor 105, both serving as drive means, through an IFIC 103. The second lens group holder frame 35 is thereby moved to a proper in-focus position. In this way, the position of the second lens group holder frame 35 can be determined on the basis of the third group frame 34. Note that the processing flow of the focusing operation and the photographing operation will be described later.

The zooming operation control of the zoom lens barrel of this embodiment, constructed as described above, is controlled by driving the motor 41 to vary the distance D2 between the second and third group lenses. In this connection, it is desirable that in the graph of FIG. 10 which indicates the relationship of the lens-to-lens spacing D2 versus the focal length, the motor 41 is driven to follow the focusing line passing the point C at the middle between the point A for $\infty$ and the point B for the closest position. The value of the spacing D2 on that focusing line is given below:

$$D2 = Dx + (Fx/2) \qquad (4)$$

By so making the zooming operation, even if the object is present anywhere far and near in the focusing, the amount by which the second lens group holder frame 35 must be moved is minimized on average. As a result, the focusing operation is shortened so as not to escape the shutter chance.

In the second embodiment, the second group frame 29 used in the above first embodiment is dispensed with, and the second lens group holder frame 35 is directly supported by the third group frame 34. Accordingly, an error otherwise caused by the third group frame to the position of the second lens group 15 relative to the third lens group 16, that gives a larger influence upon the focused position, can be eliminated to further improve the accuracy.

Also, with the structure of this embodiment, since the second lens group holder frame 35 is moved by driving force of the focusing motor 41 for the zooming and focusing operations, the second group frame, the second group pins, the second group frame cam formed in the cam ring, etc. which are provided in the above first embodiment, can be dispensed with, which contributes to reductions in both size and cost of cameras. Note that rather than driving the second lens group holder frame 35 in the zooming operation, it is alternatively possible to drive it through the distance required for focusing plus the distance required for zooming together in the focusing operation.

Additionally, in the lens barrel of this embodiment, the third group frame 34 for holding the third lens group 16 as lens means is movable along the optical axis. As a modification, however, such a lens barrel can also be proposed that the third group frame is a fixed frame fixedly arranged with respect to the optical axis. In this modification, the second lens group 15 similarly forms the focusing lens group as the focusing lens means. Then, the lens group 15 is held on the second lens group holder frame 35 and driven by the focusing motor 41 back and forth in the direction of the optical axis.

Figure 3:
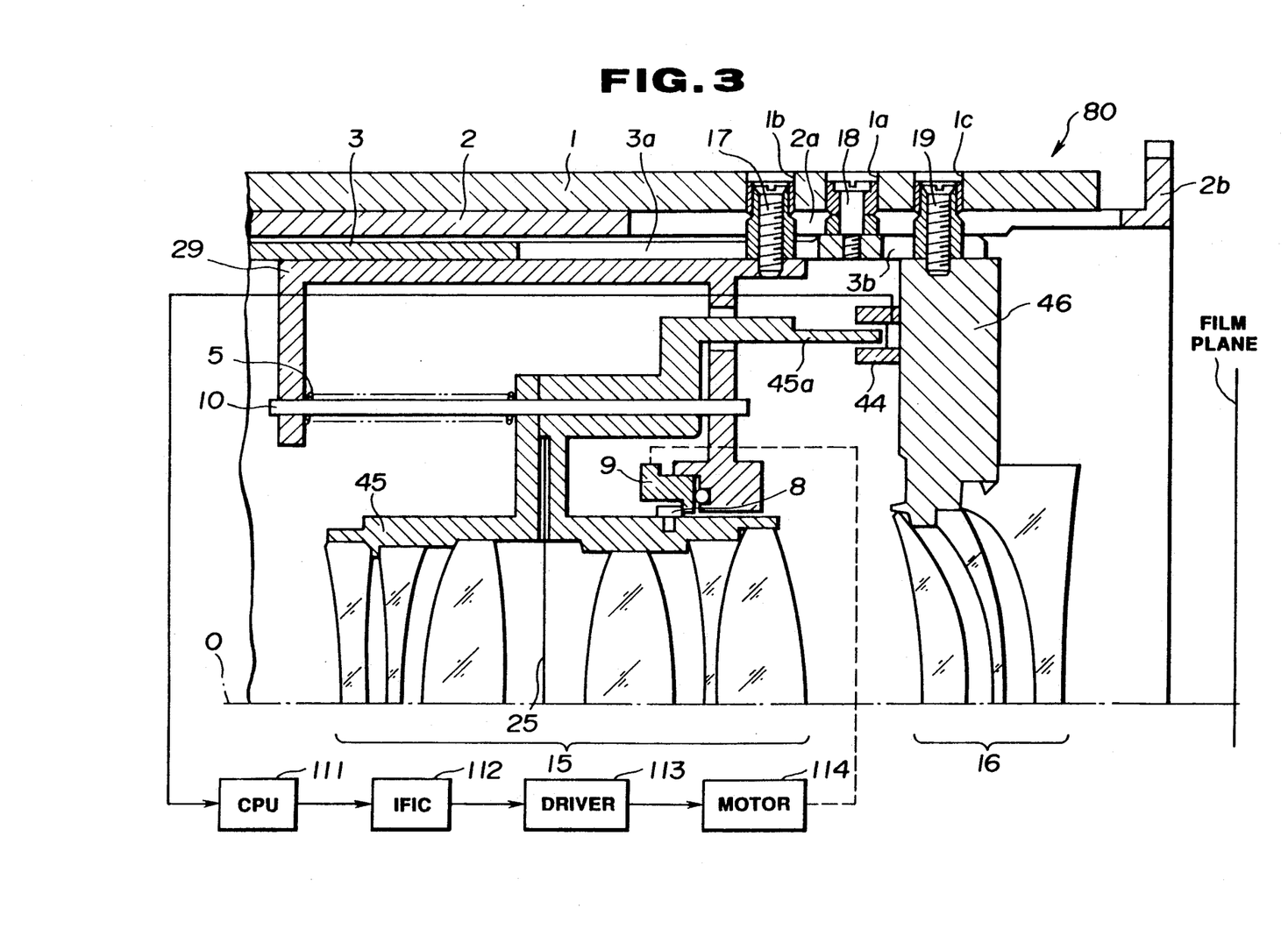
FIG. 3 is a longitudinal sectional view of main parts around second and third lens group frames of a lens barrel, showing a third embodiment of the present invention.

FIG. 3 is a longitudinal sectional view of main parts of a zoom lens barrel, showing a third embodiment of the present invention. In a lens barrel of this embodiment, a photointerruptor is used instead of the differential transformer 28 used, as frame-to-frame spacing detection means, in the first embodiment of FIG. 1. More specifically, an arm 45a in the form of a flat plate is provided on a second lens group holder frame 45 as a frame for holding a second lens group 15, and is extended toward a third group frame 46 as a frame for holding a third lens group 16 in such a manner as to be able to interrupt an optical path of a photointerruptor 44 fixed to the third group frame 46.

In the lens barrel of this embodiment, it is also assumed that the second lens group 15 is a focusing lens group as focusing lens means, and that a change in the position of the second lens group 15 relative to the third lens group 16, as lens means, causes a larger amount of change in the focused position during the focusing operation than a change in the position thereof relative to the first lens group shown in FIG. 1. Further, the second lens group holder 45 is supported by guide shafts 10 fixed to a second group frame 29, serving as a support, such that the holder 45 is movable back and forth in the direction of the optical axis. The second lens group holder 45 is driven by a focusing motor 114, as drive means, through a focusing cam 9 for the focusing operation. The driving of the motor 114 is controlled by a CPU 111. Specifically, the CPU 111 takes in an output of the photointerruptor 44 as detection or measurement means for detecting the position of the second lens group 15 relative to the third lens group 16, and then commands the motor 114 to drive the focusing cam 9 by an amount corresponding to the output through an IFIC 112 and a driver 113.

The focusing cam 9 is driven as follows. First, during the zooming operation, the relative positional relationship between the second lens group holder 45 and the third lens group frame 46 is always kept in such a condition that the optical path of the photointerruptor 44 is interrupted as shown in FIG. 3. When the second lens group holder 45 is driven by the focusing motor 114 forwardly in the direction of the optical axis upon start of the focusing operation, the arm 45a of the second lens group holder 45 is moved away from the photointerruptor 44 to turn it on. This timing when the photointerruptor 44 changes from an off-state to an on-state is used instead of the off-timing of the AF switch 13 in the prior art shown in FIG. 5. The subsequent focusing operation is similarly performed by counting the number of drive pulses from the reference position.

Thus, in the third embodiment, a particular position of the second lens group holder 45 relative to the third group frame 46 is directly detected and the focusing control is performed with the particular position being as a reference in a like manner to the prior art. This arrangement leads to the following advantage. The start timing of counting the drive pulses is given by the timing of on/off signal switching of the photointerruptor 44 and thus directly outputted with the third group frame 46 being as a reference, rather than the timing of on/off switching of the AF switch 13 in the prior art shown in FIG. 5. It is therefore possible to prevent errors due to the cams formed in the cam ring 1 and a timing error due to chattering of the AF switch 13 in the prior art.

Figure 4:
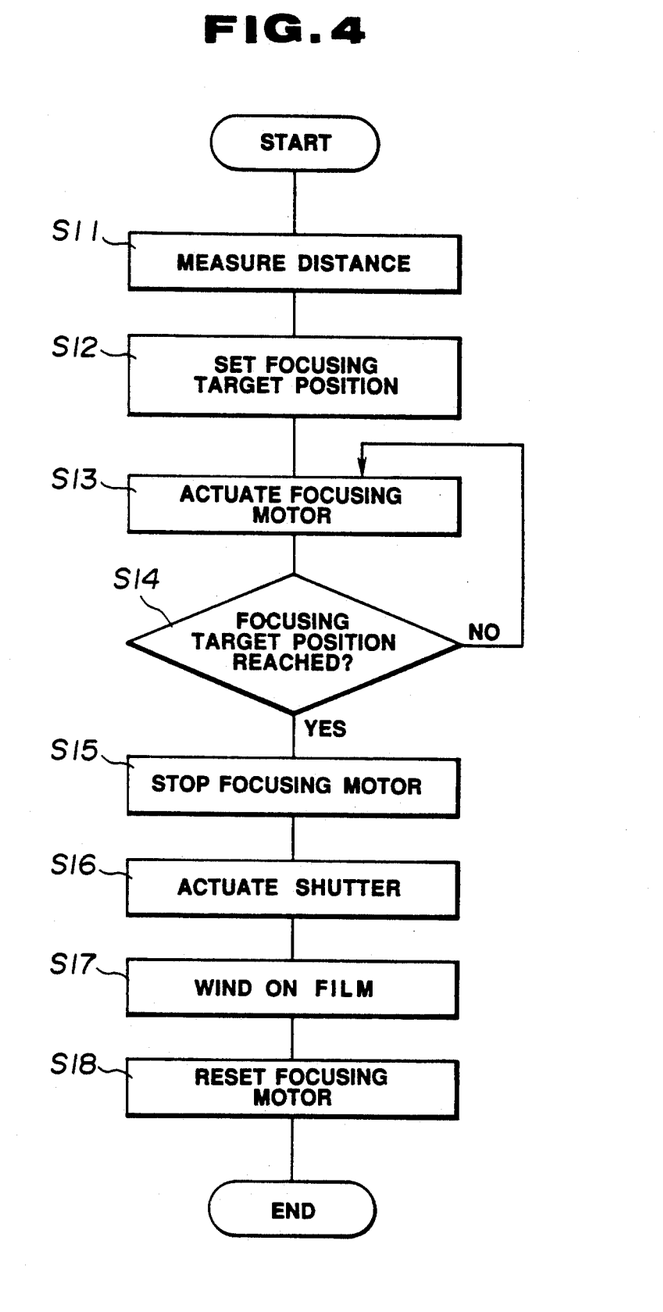
FIG. 4 is a flowchart for focusing and photographing processes by the lens barrels of FIGS. 1 and 2.

Next, processing of the focusing control and the photographing operation for the lens barrels of the first and second embodiments will be described with reference to a flowchart in FIG. 4. First, based on the result of distance measurement, the target position of the second lens group 15 relative to the third lens group 16 is set (steps S11, 12). Subsequently, the focusing motor as drive means is driven to high-accurately move and stop the second lens group 15 to and at the target position, i.e., the in-focus position, while reading the output of the differential transformer 26 or 36 as frame-to-frame spacing measurement means (steps S13, 14, 15). Thereafter, the shutter is released to execute a photo-taking process (step S16). After that, the film is wound on and the focusing motor 105 or 41 is reset to complete a series of camera operations (steps S17, 18). The reason why the focusing motor is reset after winding on the film is to reset the second lens group 15 to a predetermined position for the purpose of quickly finishing the next focusing operation. However, such a resetting may be dispensed with.

In the lens barrel of the third embodiment, the position of the second lens group 15 is detected at only a particular point and, therefore, whether the second lens group 15 has reached the target position or not cannot be directly determined by using the third lens group 16 as a reference. Accordingly, as with the prior art shown in FIG. 5, the target position of the second lens group 15 is set as the number of drive pulses and the second lens group 15 is stopped at the time the set pulse number is detected while counting the drive pulses applied to the focusing motor 114.

Figure 11:
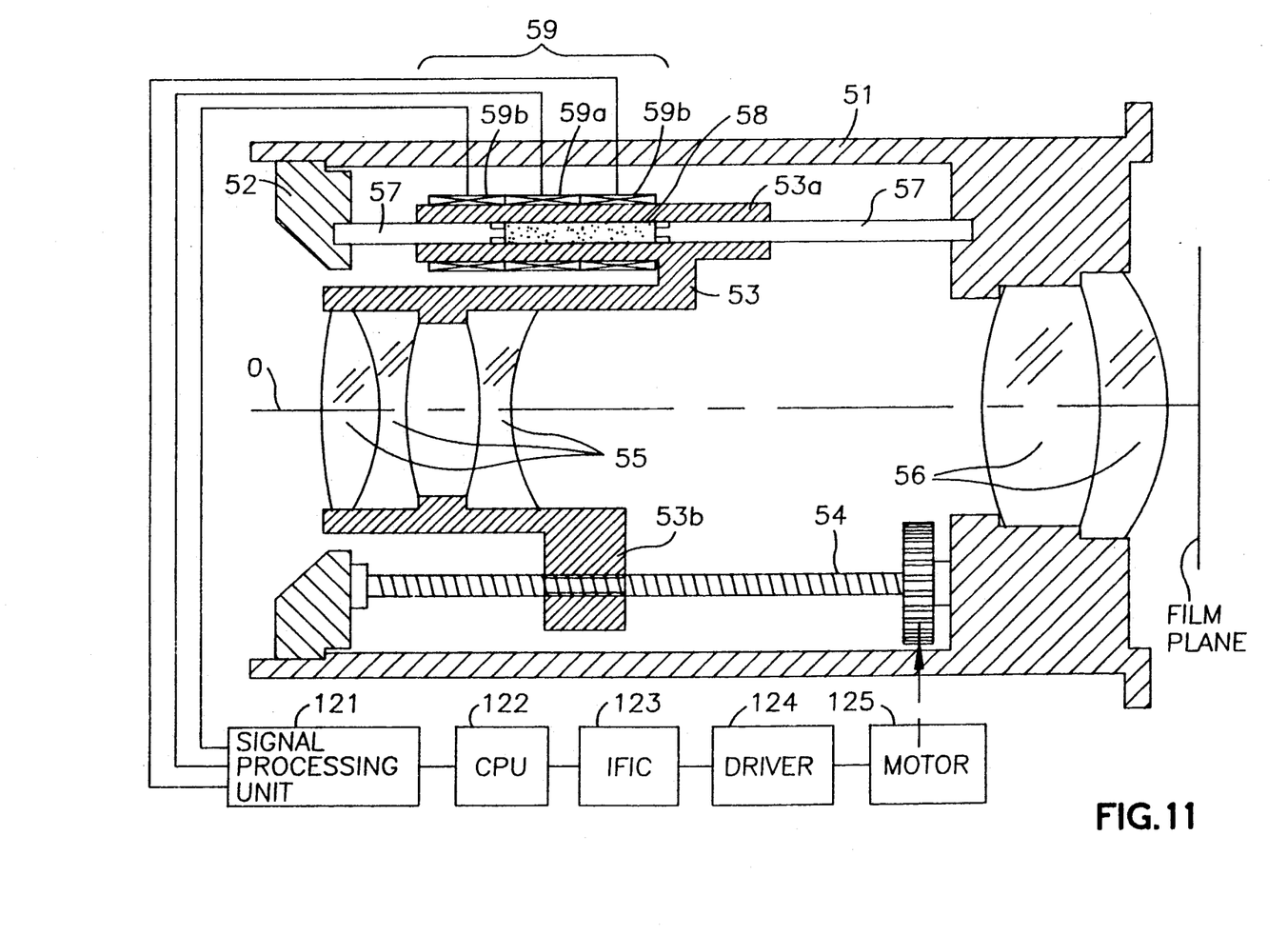
FIG. 11 is a longitudinal sectional view of main parts around first and second lens groups of a lens barrel, showing a fourth embodiment of the present invention.

FIG. 11 shows a fourth embodiment of the present invention in which a fixed frame 51 of the lens barrel supports a lens 56 as well as a right-hand end of guide shaft 57. Support ring 52, which is fixed at the front end of fixed frame 51 supports the left-hand end of guide shaft 57 so that its axis is substantially parallel with optical axis O. A dielectric core 58 is fixed on guide shaft 57 in substantially the same manner as the dielectric core 28c shown in FIG. 1 or the dielectric core 36c shown in FIG. 2.

A lens holder frame 53 supports a focusing lens group 55. Lens holder frame 53 is guided along the optical axis by guide shaft 57, which extends through guide portion 53a of frame 53.

The opposite ends of feed screw 54 are respectively rotatably supported by fixed frame 51 and support ring 52. Threaded portion 53b of lens holder frame 53 threadedly engages feed screw 54. This structure is substantially similar to the feed screw 39 and threaded portion 35b of lens group 15 shown in FIG. 2.

A differential transformer 59, which serves as the measurement means for determining the spacing between the fixed frame 51 and the movable lens holder frame 53, includes a primary coil 59a, secondary coils 59b and a core 58. The position of frame 53 relative to fixed frame 51 is determined by a detected voltage outputted by differential transformer 59. This detected voltage is applied to a signal processing circuit 121. The differential transformer 59 and signal processing circuit 121 are substantially the same as the differential transformer 36 and signal processing circuit 101 shown in FIG. 2.

The detected voltage from signal processing circuit 121 is applied to CPU 122, which drives a driver circuit 124 through the IFIC circuit 123. The output of driver 124 controls motor 125, which rotates feed screw 54 through a suitable gear drive, which gear drive may be similar to that shown in FIG. 2. CPU 122, IFIC circuit 123, driver 124 and motor 125 are substantially same as CPU 102, IFIC circuit 103, driver 104 and motor 41 shown in FIG. 2.

Operation of motor 125 in this manner moves frame 53 to a proper in-focus position along guide shaft 57.

In the embodiment of FIG. 11, motor 125 is driven on the basis of the detected voltage of differential transformer 59. In-focus control is obtained by movement of lens holder frame 53 relative to fixed frame 51.

What is claimed is:
1. A lens barrel comprising:
focusing lens means comprising one or more lens groups,
second lens means comprising at least one lens, the positional relationship of said second lens means relative to said focusing lens means exerting the largest influence upon a focused condition, drive means for selectively moving said focusing lens means back and forth in a direction of an optical axis, measurement means comprising dielectric means fixed to said second lens means and coil means provided on a frame of said focusing lens means to be spacedly wound around said dielectric means, said measurement means detecting a position of said dielectric means relative to said coil means in the form of a differential voltage and measuring a spacing between said focusing lens means and said second lens means, and control means for controlling said drive means to move said focusing lens means to a proper in-focus position responsive to said measurement means.

2. A lens barrel according to claim 1, wherein said focusing lens means is divided into a frame holding a lens and at least one support, said frame being movable by said drive means relative to said support, and said frame slidably engaging a guide shaft fixed to said support so that said frame is movable by said drive means in the direction of the optical axis.

3. A lens barrel according to claim 1, wherein said focusing lens means and said second lens means are adjacent to each other.

4. A lens barrel comprising:

focusing lens means comprising one or more lens groups, second lens means comprising at least one lens, the positional relationship of said second lens means relative to said focusing lens means exerting the largest influence upon a focused condition, drive means for selectively moving said focusing lens means back and forth in a direction of an optical axis, measurement means comprising dielectric means fixed to a frame of said second lens means and coil means provided on a frame of said focusing lens means to be spacedly wound around said dielectric means, said measurement means detecting a position of said dielectric means relative to said coil means in the form of a differential voltage and measuring a spacing between said focusing lens means and said second lens means, and control means for controlling said drive means to move said focusing lens means to a proper in-focus position responsive to said measurement means.

5. A lens barrel comprising:

focusing lens means comprising one or more lens groups, a frame holding lens means which is positioned adjacent to said focusing lens means and comprises at least one lens, the positional relationship of said frame relative to said focusing lens means exerting the largest influence upon a focused condition, a guide shaft fixed to said frame and supporting said focusing lens means in such a manner as to enable said focusing lens means to move back and forth in a direction of an optical axis, measurement means comprising dielectric means fixed to said frame and coil means provided on said focusing lens means to be spacedly wound around said dielectric means, said measurement means detecting a position of said dielectric means relative to said coil means in the form of a differential voltage and measuring a spacing between said focusing lens means and said frame holding lens means, drive means for selectively moving said focusing lens means back and forth along said guide shaft in the direction of the optical axis, and control means for controlling said drive means to move said focusing lens means to a proper in-focus position responsive to said measurement means.

6. A lens barrel comprising:

a support movable back and forth along a cam groove in a direction of an optical axis, a guide shaft fixed to said support, focusing lens means comprising one or more lens groups movable back and forth along said guide shaft in the direction of the optical axis, second lens means comprising at least one lens, the positional relationship of said second lens means relative to said focusing lens means exerting the largest influence upon a focused condition, a photointerruptor provided on said second lens means and being turned on and off in response to the back-and-forth movement of said focusing lens means to provide a signal, drive means for selectively moving said focusing lens means back and forth along said guide shaft in the direction of the optical axis, and control means for controlling said drive means to move said focusing lens means to a proper in-focus position responsive to a signal of said photointerruptor.

7. A lens barrel according to claim 6, wherein said focusing lens means and said second lens means are adjacent to each other.

8. A lens barrel comprising:

focusing lens means comprising one or more lens groups arranged in said barrel, second lens means arranged in said barrel and including at least one lens whose positional relationship relative to said focusing lens means exerts the largest influence upon a focused condition, drive means for selectively moving said focusing lens means back and forth in a direction of an optical axis, measurement means arranged in said lens barrel for measuring a spacing between said focusing lens means and said second lens means, and control means for controlling said drive means to move said focusing lens means to a proper in-focus position responsive to said measurement means.

9. A lens barrel according to claim 8, wherein said focusing lens means and said second lens means are adjacent to each other.

10. A lens barrel comprising:

focusing lens means comprising one or more lens groups, second lens means including at least one lens whose positional relationship relative to said focusing lens means exerts the largest influence upon a focused condition, drive means for selectively moving said focusing lens means back and forth in a direction of an optical axis, measurement means for measuring a spacing between said focusing lens means and said second lens means, and control means for controlling said drive means to move said focusing lens means to a proper in-focus position responsive to said measurement means;

said measurement means comprising a dielectric fixed to said second lens means and coil means provided on a frame of said focusing lens means to be spacedly wound around said dielectric, thereby detecting a position of said dielectric relative to said coil means in the form of a differential voltage.

11. A lens barrel comprising:

focusing lens means comprising one or more lens groups, second lens means including at least one lens whose positional relationship relative to said focusing lens means exerts the largest influence upon a focused condition, drive means for selectively moving said focusing lens means back and forth in a direction of an optical axis, measurement means for measuring a spacing between said focusing lens means and said second lens means, and control means for controlling said drive means to move said focusing lens means to a proper in-focus position responsive to said measurement means;

said focusing lens means being divided into a frame holding a lens and at least one support, said frame being movable relative to said support by said drive means and said frame being guided by a guide shaft fixed to said support so that said frame is movable by said drive means in the direction of the optical axis.

12. A lens barrel according to claim 11, wherein a photointerruptor being turned on and off in response to a back-and-forth movement of said frame constituting said focusing lens means is provided on a frame of said second lens means, and said control means controls said drive means to move said focusing lens means to a proper in-focus position responsive to a signal of said photointerruptor.

13. A lens barrel according to claim 11, wherein a core shaft having a dielectric therearound is also fixed to a frame of said second lens means in addition to said guide shaft, said core shaft constituting measurement means in cooperation with an arm which serves as a part of the frame of said focusing lens means and includes coil means provided to be spacedly wound around said dielectric.

14. A lens barrel according to claim 11, wherein a core shaft having a dielectric therearound is also fixed to a frame of said second lens means in addition to said guide shaft, said core shaft constituting measurement means in cooperation with an arm which serves as a part of the frame of said focusing lens means and includes coil means provided to be spacedly wound around said dielectric.

15. A lens barrel comprising:

focusing lens means arranged in said barrel and comprising one or more lens groups, second lens means arranged in said barrel adjacent to said focusing lens means and including at least one lens of which a positional relationship relative to said focusing lens means exerts the largest influence upon a focused condition, measurement means arranged in said barrel for measuring a spacing between said focusing lens means and said second lens means, and drive means for selectively moving said focusing lens means back and forth in a direction of an optical axis; and means responsive to said measurement means for operating said drive means to move the focusing lens means to a focussed condition.

16. A lens barrel according to claim 15, further comprising control means for controlling said drive means to move said focusing lens means to a proper in-focus position in accordance with an output of said differential voltage measurement means.

17. A lens barrel comprising:

focusing lens means comprising one or more lens groups, second lens means adjacent to said focusing lens means and including at least one lens of which a positional relationship relative to said focusing lens means exerts the largest influence upon a focused condition, measurement means for measuring a spacing between said focusing lens means and said second lens means, and drive means for selectively moving said focusing lens means back and forth in a direction of an optical axis;

said measurement means comprising a dielectric fixed to said second lens means and coil means provided on a frame of said focusing lens means to be spacedly wound around said dielectric, thereby detecting a position of said dielectric relative to said coil means in the form of a differential voltage.

18. A lens barrel according to claim 17, further comprising control means for controlling said drive means to move said focusing lens means to a proper in-focus position responsive to said detected differential voltage.

19. A lens barrel comprising:

focusing lens means comprising one or more lens groups, second lens means adjacent to said focusing lens means and including at least one lens of which a positional relationship relative to said focusing lens means exerts the largest influence upon a focused condition, measurement means for measuring a spacing between said focusing lens means and said second lens means, and drive means for selectively moving said focusing lens means back and forth in a direction of an optical axis;

said focusing lens means being divided into a frame holding a lens and at least one support, said frame being movable relative to said support through said drive means, and said frame being guided by a guide shaft fixed to said support so that said frame is movable by said drive means in the direction of the optical axis.

20. A lens barrel according to claim 19, wherein a photointerruptor being turned on and off in response to the back-and-forth movement of said frame constituting said focusing lens means is provided on a frame of said second lens means, and said control means controls said drive means to move said focusing lens means to a proper in-focus position responsive to a signal of said photointerruptor.

21. A lens barrel according to claim 19, wherein a core shaft having a dielectric therearound is also fixed to a frame of said second lens means in addition to a guide shaft, said core shaft constituting said measurement means in cooperation with an arm which serves as a part of the frame of said focusing lens means and includes coil means provided to be spacedly wound around said dielectric.

22. A lens barrel comprising:
   a lens holder frame arranged in said barrel for holding one lens or lens group and being movable in a direction of an optical axis,
   a fixed frame arranged in said barrel for holding another lens or lens group, the positional relationship between the lens holder frame and the fixed frame exerts the largest influence upon a focused condition
   measurement means for directly detecting a position of said lens holder frame relative to said fixed frame in the direction of the optical axis, and
   drive means responsive to said measurement means for changing the position of said lens holder frame relative to said fixed frame in the direction of the optical axis to provide an in-focus condition.

23. A lens barrel according to claim 22, wherein said lens holder frame is a focusing lens frame.

24. A lens barrel comprising:
   two lens moving frames adjacent to each other and movable in a direction of an optical axis while changing a spacing between said two lens moving frames,
   drive means for changing the relative positional relationship between said two lens moving frames in the direction of the optical axis, and
   detection means comprising a pair of elements to directly detect the relative positional relationship between said two lens moving frames, one of said pair of elements being provided on one of said two lens moving frames and the other of said pair of elements being provided on the other of said two lens moving frames.

25. A lens barrel according to claim 24, wherein said detection means is a differential transformer.

26. A lens barrel according to claim 24, wherein said detection means is a photointerruptor.

27. A lens barrel comprising:
   focusing lens means arranged in said barrel and comprising at least one lens group;
   second lens means arranged on said barrel and comprising at least one lens, the positional relationship between said focusing lens means and said second lens means affecting a focused condition;
   driving means for selectively moving said focusing lens means in a direction of an optical axis;
   measurement means arranged in said barrel for measuring the spacing between said focusing lens means and said second lens means; and
   control means for controlling said driving means to move said focusing lens means to a proper in-focus condition responsive to said measurement means.

28. A lens barrel comprising:
   focusing lens means comprising at least one lens group;
   second lens means comprising at least one lens, the positional relationship between said focusing lens means and said second lens means affecting a focused condition;
   driving means for selectively moving said focusing lens means in a direction of an optical axis;
   measurement means for measuring the spacing between said focusing lens means and said second lens means; and
   control means for controlling said driving means to move said focusing lens means to a proper in-focus condition responsive to said measurement means;
   said measurement means comprising a detectible member mounted on one of said focusing lens means and said second lens means; and
   a detection member mounted on the remaining one of said focusing lens means and said second lens means, said detection member being positioned in close proximity to said detectible member and including means for generating a signal representative of the position of said detectible member relative to said detection member.

29. A lens barrel according to claim 28 wherein said detectible member is a rod-shaped member and said detection means further comprises hollow guiding means for movably receiving said detectible member and means surrounding said hollow guiding means for generating a signal representative of the relative position of said detectible member within said hollow guiding means.

30. A lens barrel comprising:
   a housing;
   focusing lens means in said housing comprising at least one lens group;
   second lens means in said housing comprising at least one lens, the positional relationship between said focusing lens means and said second lens means effecting a focus condition;
   driving means in said housing for selectively moving said focusing lens means in a direction of an optical axis;
   measurement means in said housing for measuring the spacing between said focusing lens means and said second lens means; and
   control means for controlling said driving means to move said focusing lens means to a proper in-focus condition responsive to said measurement means.

31. A lens barrel comprising:
   focusing lens means comprising at least one lens group;
   second lens means comprising at least one lens, the positional relationship between said focusing lens means and said second lens means effecting a focused condition;
   driving means for selectively moving said focusing lens means in a direction of an optical axis;
   measurement means including a first member directly coupled to said second lens means and a second member directly coupled to said focusing lens means, said first and second members interacting to provide a signal representing the spacing distance between said focusing lens means and said second lens means; and
   a control means for controlling said driving means to move said focusing said lens means to a proper in-focus condition responsive to said distance signal.

* * * * *

UNITED STATES PATENT AND TRADEMARK OFFICE
CERTIFICATE OF CORRECTION

PATENT NO. : 5,301,066
DATED      : April 5, 1994
INVENTOR(S): Masayu Higuchi, Yuichi Torikoshi, Hiroshi Terada and Takeshi Ito It is certified that error appears in the above-indentified patent and that said Letters Patent is hereby corrected as shown below:

Column 1, line 61 change "groups" to --group--.
Column 2, line 65 change "closet" to --closest--.
Column 4, line 4 change "len" to --lens--.

Column 6, line 46 change "wearing" to --wear--.
Column 7, line 60 change "105" to --41--.
Column 8, line 38 delete "group".

Signed and Sealed this

Seventh Day of March, 1995

BRUCE LEHMAN

*Attest:*

*Attesting Officer*          *Commissioner of Patents and Trademarks*